Oct. 13, 1931.　　　M. J. KNOUD　　　1,827,367
RIDING BRIDLE
Filed Sept. 23, 1930
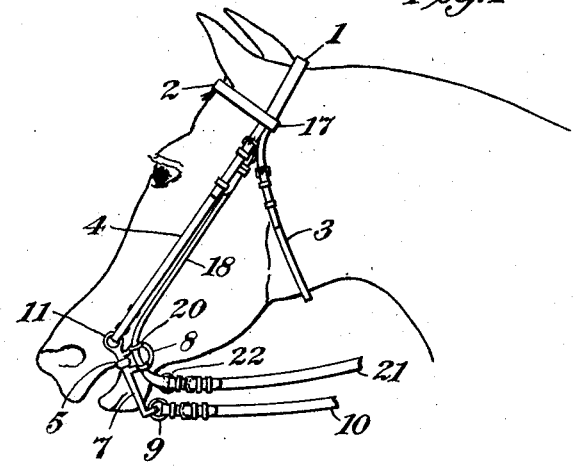
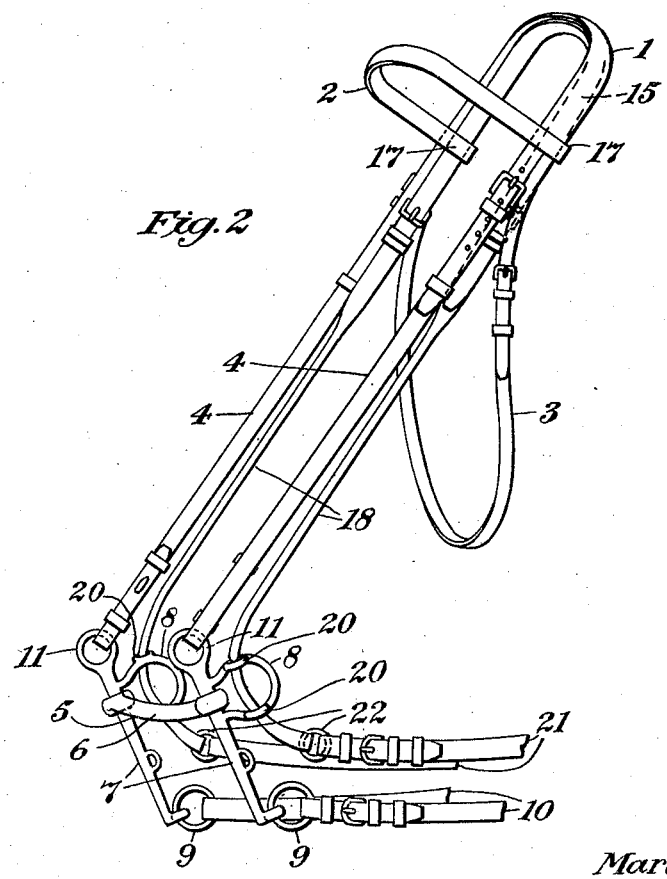
INVENTOR
Martha J. Knoud
BY
ATTORNEY Patented Oct. 13, 1931

1,827,367

UNITED STATES PATENT OFFICE

MARTHA J. KNOUD, OF FLUSHING, NEW YORK

RIDING BRIDLE

Application filed September 23, 1930. Serial No. 483,826.

This invention relates to riding bridles and has for its object the provision in a bridle of this type of means for controlling a horse that is not readily amenable to control by pressure on its mouth as effected by the ordinary bit. For instance, some horses attempt to avoid bit control by dropping their heads and taking the bit between their teeth. This is known as "boring", and a horse addicted to such habit is difficult to control with the ordinary bit. When a horse is in harness, such habit or tendency may be prevented by the use of a check or gag-rein which passes from the bit upwardly through loops on the bridle and from thence backwardly to a fixed hook on the harness saddle; by this means permanently holding the horse's head in a raised position in which he is quite amenable to ordinary bit control. With a horse under saddle however, he is not subject to the same restraint as when in harness and for such reason it becomes necessary to make special provision for his control when not readily tractable under the ordinary bit. I do this in accordance with my present invention by associating with the ordinary riding bridle employing a straight bar "Pelham" bit, a poll strap in the form of a loop passing over the "poll" or top of the horse's head with its opposite ends running loosely through eyes formed in the cheek-rings of the bit and terminating in a riding rein running back to the saddle. With this arrangement and construction of parts, pull on the poll strap rein will act to bring pressure on the poll of the horse through the connected poll strap, which pressure results in enabling the rider to keep the horse's head in a raised position and so prevent boring. Furthermore, such connection of the poll strap and attached riding rein with the cheek-rings of the bit permit of the normal use of the latter as a Pelham or gag bit as well as a boring bit.

Referring now to the accompanying drawings forming part of this specification,

Fig. 1 shows a horse's head having thereon a bridle employing my invention, and

Fig. 2 is a perspective view of the bridle removed from the horse's head.

The bridle shown, aside from the features constituting my invention, is of usual construction, the same comprising the head or poll piece 1, brow band 2, throat latch 3, cheek straps 4, and bit 5, the latter being detachably connected to the lower ends of the cheek straps 4. The bit 5 is of the so-called "Pelham" type and comprises the mouth bar 6, connected at its ends with the transversely arranged cheek bars 7 having integral rings 8 which merge with the bars at points above and below the connecting ends of the mouth bar as shown. These rings 8, in the ordinary use of the bit, are adapted for the connection therewith of the usual riding rein, while rings 9 at the lower ends of the bars provide for the connection of the lower or curb rein 10 which is effective for applying pressure to the lower jaw of the horse through the curb strap or chain connecting with the eyes 11 in the upper ends of the bars 7 when a curb is used. When such curb is omitted, as in the present case, the lower rein 10 may be used as an ordinary riding rein.

In accordance with the present invention, as hereinbefore referred to, I provide a poll strap 15 in the form of a loop which is adapted to pass over the top of the horse's head just behind the ears, where it is retained in position by passing through the end loops 17 in the brow band 2, and from whence its side members 18 pass downwardly and loosely through eyes 20, 20 formed in the cheek rings 8 of the bit and connect with a riding rein 21. As shown, the ends of the poll strap rein are detachably connected with the ends of the riding rein through rings 22, although it will be understood that the said strap and rein may be formed in one piece if so desired.

In riding, pull on the rein 21 will act to draw the lower ends of the poll strap through the eyes 20, 20 of the bit cheek rings and so cause the upper or loop end of said strap to exert sufficient pressure on the poll of the horse to enable the rider to readily keep the horse's head in a raised position and so prevent his boring. The connection of the poll strap and attached riding rein directly with the cheek rings of the bit enables said rein to be utilized as an ordinary driving rein when the horse is under proper control, as the poll strap, by reason of its free running connection with the bit through the eyes 20, will immediately release its pressure on the horse's poll upon an easing of the pull on the riding rein by the rider.

What I claim is:

In a riding bridle, the combination with the usual head piece having depending cheek straps, of a bit comprising a mouth bar having end bars connected at their upper terminals with said cheek straps and at their lower terminals having rings for connection with a riding rein, said end bars also having integral cheek members in the form of rings located opposite the ends of the mouth bar and each having aligned eyes at the upper and lower sides thereof, a loop strap for passing over the poll of the horse with its ends running loosely through the said eyes on the cheek members and terminating in a riding rein, and a second riding rein connecting with said rings at the lower terminals of the end bars.

In testimony whereof I affix my signature.

MARTHA J. KNOUD.